United States Patent
Goodman et al.

(10) Patent No.: US 7,155,743 B2
(45) Date of Patent: Dec. 26, 2006

(54) METHOD AND SYSTEM FOR CONTROLLING USE OF A DYNAMICALLY LINKED SOFTWARE LIBRARY

(75) Inventors: Daniel I Goodman, Beit Shemesh (IL); David Leib, Beit Shemesh (IL)

(73) Assignee: Finjan Software, Ltd, South Netanya (IL)

( * ) Notice: Subject to any disclaimer, the term of this patent is extended or adjusted under 35 U.S.C. 154(b) by 866 days.

(21) Appl. No.: 10/202,550

(22) Filed: Jul. 23, 2002

(65) Prior Publication Data
US 2003/0028809 A1 Feb. 6, 2003

Related U.S. Application Data

(63) Continuation-in-part of application No. 09/774,236, filed on Jan. 29, 2001, which is a continuation-in-part of application No. 09/397,331, filed on Sep. 14, 1999, now Pat. No. 6,298,446, which is a continuation-in-part of application No. 09/313,067, filed on May 17, 1999, now Pat. No. 6,209,103.

(51) Int. Cl.
*G06F 12/14* (2006.01)
(52) U.S. Cl. ........................................................ 726/25
(58) Field of Classification Search ................ 713/167; 726/30, 25
See application file for complete search history.

(56) References Cited

U.S. PATENT DOCUMENTS

| | | | |
|---|---|---|---|
| 4,405,829 A | | 9/1983 | Rivest et al. |
| 5,999,622 A | * | 12/1999 | Yasukawa et al. ............ 705/51 |
| 6,675,201 B1 | * | 1/2004 | Parkkinen ................... 709/216 |
| 6,694,434 B1 | * | 2/2004 | McGee et al. .............. 713/189 |
| 2002/0112250 A1 | * | 8/2002 | Koplar et al. ............... 725/153 |

OTHER PUBLICATIONS

Secure Hash Standard, Federal Information Processing Standards Publication 1801-1; Apr. 17, 1995; http://www.itl.nist/gov/fipspubs/fip180-1.htm: 18 pages.
Overview of Cryptographic Services; http://opengroup.org/public/tech/security/gcs/overview.htm; Copyright X/Open Company Limited, 1996; 5 pages.

* cited by examiner

*Primary Examiner*—Jacques Louis-Jacques
*Assistant Examiner*—Andrew L. Nalven
(74) *Attorney, Agent, or Firm*—Perkins Coie LLP (57) ABSTRACT

A method for authenticating a software library, including inserting an encrypted checksum into a software library, and in response to loading the software library calculating a checksum of the software library, requesting the encrypted checksum from the library, decrypting the encrypted checksum, and checking whether or not the decrypted checksum agrees with the calculated checksum. A system is also described and claimed.

56 Claims, 5 Drawing Sheets

METHOD AND SYSTEM FOR CONTROLLING USE OF A DYNAMICALLY LINKED SOFTWARE LIBRARY

CROSS REFERENCES TO RELATED APPLICATIONS

This application is a continuation-in-part of assignee's application U.S. Ser. No. 09/774,236, filed on Jan. 29, 2001, entitled "Method and System for Copy Protection of Data Content," which is a continuation-in-part of U.S. Ser. No. 09/397,331, filed on Sep. 14, 1999 now U.S. Pat. 6,298,446, entitled "Method and System for Copyright Protection of Digital Images Transmitted over Networks," which is a continuation-in-part of U.S. Ser. No. 09/313,067, filed on May 17, 1999 now U.S. Pat. No. 6,209,103, entitled "Methods and Apparatus for Preventing Reuse of Text, Images and Software Transmitted via Networks", each of which is incorporated by reference herein.

FIELD OF THE INVENTION

The present invention relates to copy protection of data content, including content that is displayed by a computer on a display device.

BACKGROUND OF THE INVENTION

Content protection systems often operate by encrypting protected content on server computers, and by using special client viewers to decrypt the encrypted content on client computers. Such a client viewer may be designed as a dynamic link library (DLL) that loads into viewer applications. Using such a DLL, application developers may design their own application interfaces for accessing encrypted content.

Figure 1:
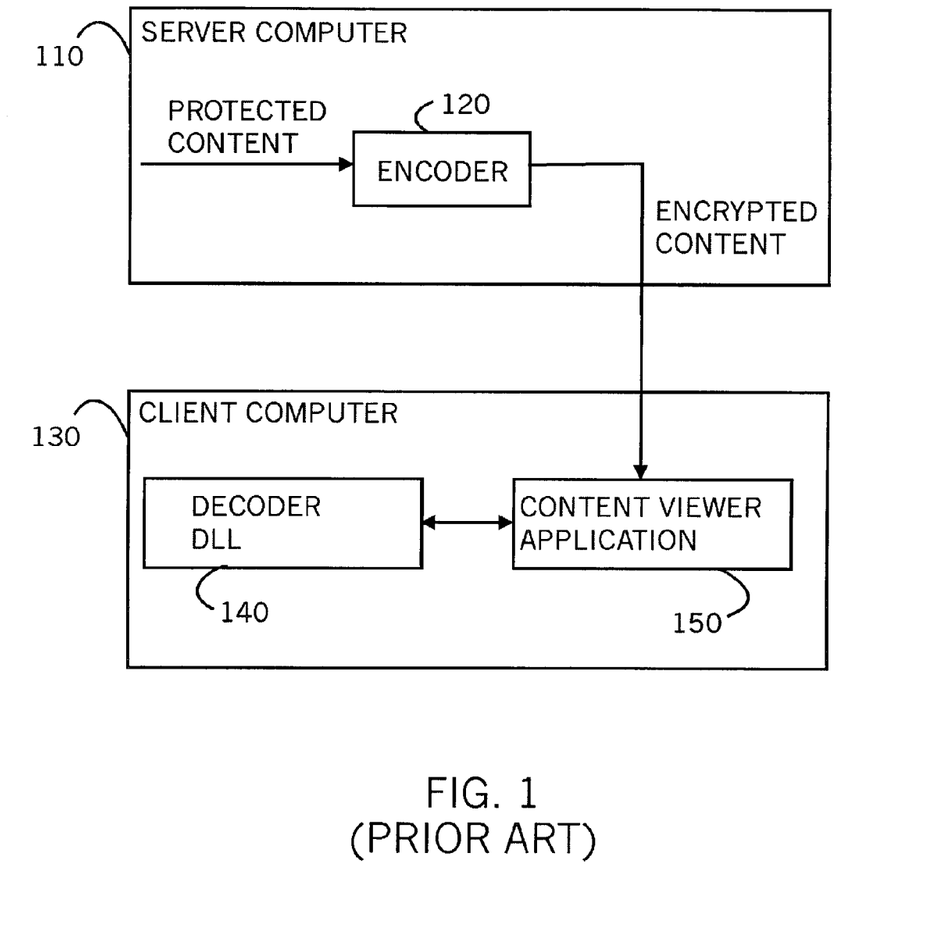
FIG. 1 is a simplified block diagram of a prior art content protection system.

FIG. 1 is a simplified block diagram of a prior art content protection system. A server computer 110 includes an encoder 120 for encrypting protected content. A client computer 130 includes a decoder DLL 140 for decoding encrypted content it receives from server computer 110. A content viewer application 150 loads and runs decoder DLL 140 within a user interface for viewing the protected content.

Content viewer application 150 is intended to be a trusted application, having access permission to the protected content. However, although decoder DLL 140 is not published, it is nevertheless possible for a hacker to reverse engineer the application programming interface (API) for decoder DLL 140, and to program his own rogue viewer application to load and run decoder DLL 140.

The ability to develop a rogue application running decoder DLL 140 defeats the purpose of a content protection system.

SUMMARY OF THE INVENTION

The present invention provides a method and system for a software library, such as a dynamically linked library (DLL) to verify whether or not an application loading it is a trusted application. Upon determination that the application is trusted, the software library can run normally. However, upon determination that the application is not trusted, the software library refuses to load.

Using the present invention, content protection systems, such as the system illustrated in FIG. 1, can ensure that rogue applications do not run DLLs required to decrypt encrypted content.

More generally, the present invention provides a method and system to verify that a software library or application is authentic. In a preferred embodiment, the present invention, a checksum of an authentic software library or application is embedded within the library or application, respectively. To prevent forgery, the embedded checksum is first encrypted, preferably using a private/public key encryption. That is, the checksum is encrypted using a private key that is not included within the software library or application, but the encrypted checksum is decrypted using a public key. The encrypted checksum is embedded within the library or application.

To verify that a software library or application is authentic, one directly calculates its checksum, and compares the calculated checksum with the checksum embedded therewithin.

There is thus provided in accordance with a preferred embodiment of the present invention a method for authenticating a software library, including inserting an encrypted checksum into a software library, and in response to loading the software library calculating a checksum of the software library, requesting the encrypted checksum from the library, decrypting the encrypted checksum, and checking whether or not the decrypted checksum agrees with the calculated checksum.

There is further provided in accordance with a preferred embodiment of the present invention a method for controlling use of a software library, including identifying a caller application that is calling a software library, calculating a checksum of the caller application, retrieving an encrypted checksum from the caller application, decrypting the encrypted checksum, and checking whether or not the decrypted checksum agrees with the calculated checksum.

There is yet further provided in accordance with a preferred embodiment of the present invention a system for authenticating a software library, including a data processor inserting an encrypted checksum into a software library, a checksum calculator calculating a checksum of the software library, an interface for obtaining the encrypted checksum from the library upon request, a decoder decrypting the encrypted checksum, and a comparator determining whether or not the decrypted checksum agrees with the calculated checksum.

There is additionally provided in accordance with a preferred embodiment of the present invention a system for controlling use of a software library, including a system processor identifying a caller application that is calling a software library, an interface for obtaining an encrypted checksum from the caller application, a decoder decrypting the encrypted checksum, a checksum calculator calculating a checksum of the caller application; and a comparator determining whether or not the decrypted checksum agrees with the calculated checksum.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a method and system for authenticating a software library or application. In a preferred embodiment, the present invention calculates a checksum of an authentic software library or application, and embeds the checksum within the library or application, respectively. To prevent forgery, the checksum is first encrypted, preferably using a private/public key encryption, and the encrypted checksum is embedded within the library or application.

To verify whether or not the library or application is authentic, the present invention directly calculates the checksum of the library or application, respectively, and compares the calculated checksum with the embedded checksum. If they agree, then the library or application is authentic. Otherwise, the library or application is not authentic.

An n-bit checksum of a sequence of bits is typically a module 2 sum of the n-bit blocks within the sequence. More generally, an n-bit checksum can be a function of the bits, such as a sum of different multiples of the bits where only the n least significant bits of the summands are calculated. Checksums were originally used in data link control for error detection in packet transmission. A well-known checksum used in the prior art is a cyclic redundancy check (CRC32) bit sequence.

Preferably checksums used with the present invention are secure checksums, also referred to as one-way functions or cryptographic checksums. Such checksums are characterized in that it is computationally infeasible to find a message having a given checksum, or to find two different messages that produce the same checksum. An example of such a checksum is the Secure Hash Algorithm, SHA-1, a description of which is available on the Internet at http://www.itl.nist.gov/fipspubs/fip180-1.htm.

Private/public key encryption is described in U.S. Pat. No. 4,405,829 to Rivest et al.

Figure 2:
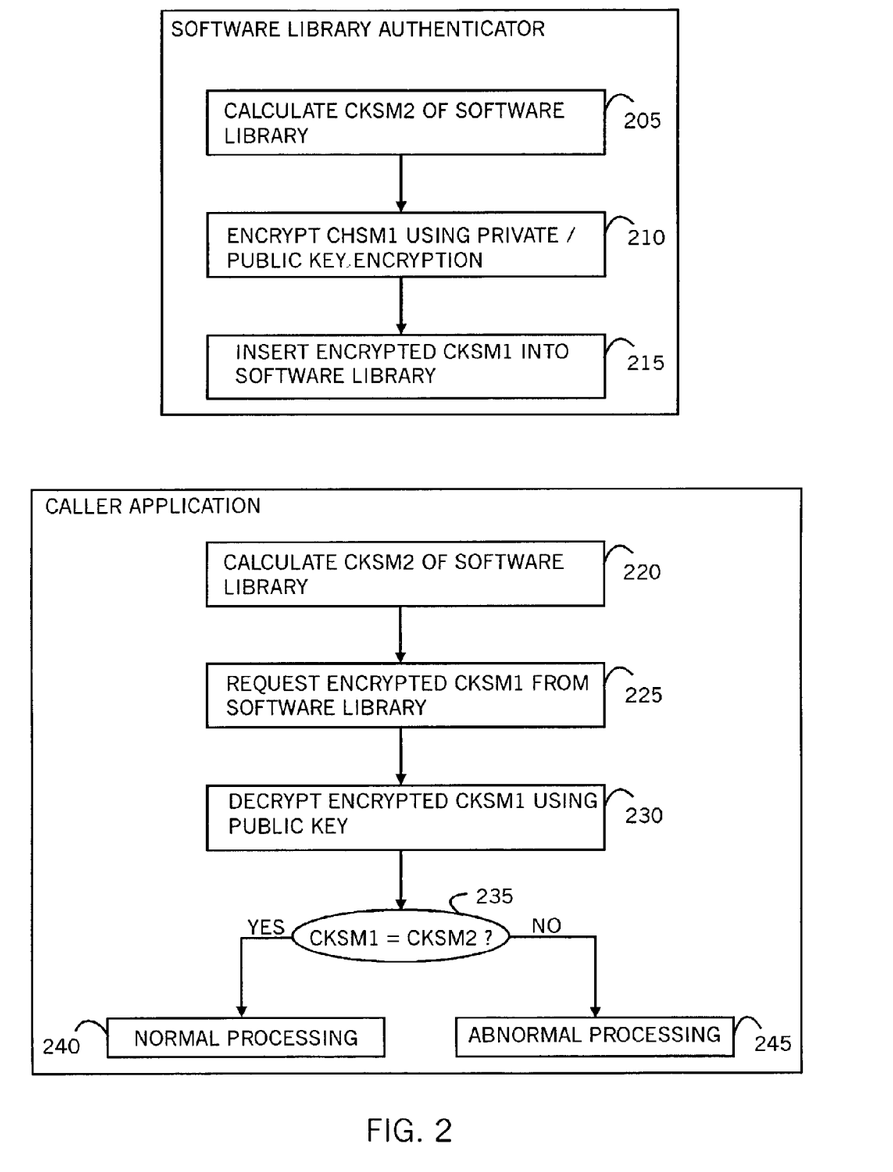
FIG. 2 is a simplified flowchart of a method for authenticating a software library, in accordance with a preferred embodiment of the present invention.

Reference is now made to FIG. 2, which is a simplified flowchart of a method for authenticating a software library, in accordance with a preferred embodiment of the present invention. At step 205, a checksum for an authentic software library, denoted CKSM1, is calculated. At step 210 CKSM1 is encrypted, preferably using a private/public key encryption. At step 215 the encrypted CKSM1 is inserted into the software library. Steps 205, 210 and 215 are preferably performed by a software library authenticator. The result of these steps is embedding of an encrypted CKSM1 into the authentic software library.

At step 220 a caller application, desiring to verify that a software library it uses is authentic, calculates its own checksum of the software library, denoted CKSM2. At step 225 the caller application requests the encrypted CKSM1 from the software library, preferably using a method of the library for retrieving the encrypted CKSM1. At step 230 the caller application decrypts the encrypted CKSM1 it receives from the software library, preferably using a public key. At step 235 the caller application determines whether or not CKSM1 equals CKSM2. If so, then at step 240 the caller application concludes that the software library is authentic and proceeds normally to use the library. Otherwise, at step 245 the caller application concludes that the software library is not authentic, and proceeds abnormally. Abnormal processing may include aborting, for example.

Figure 3:
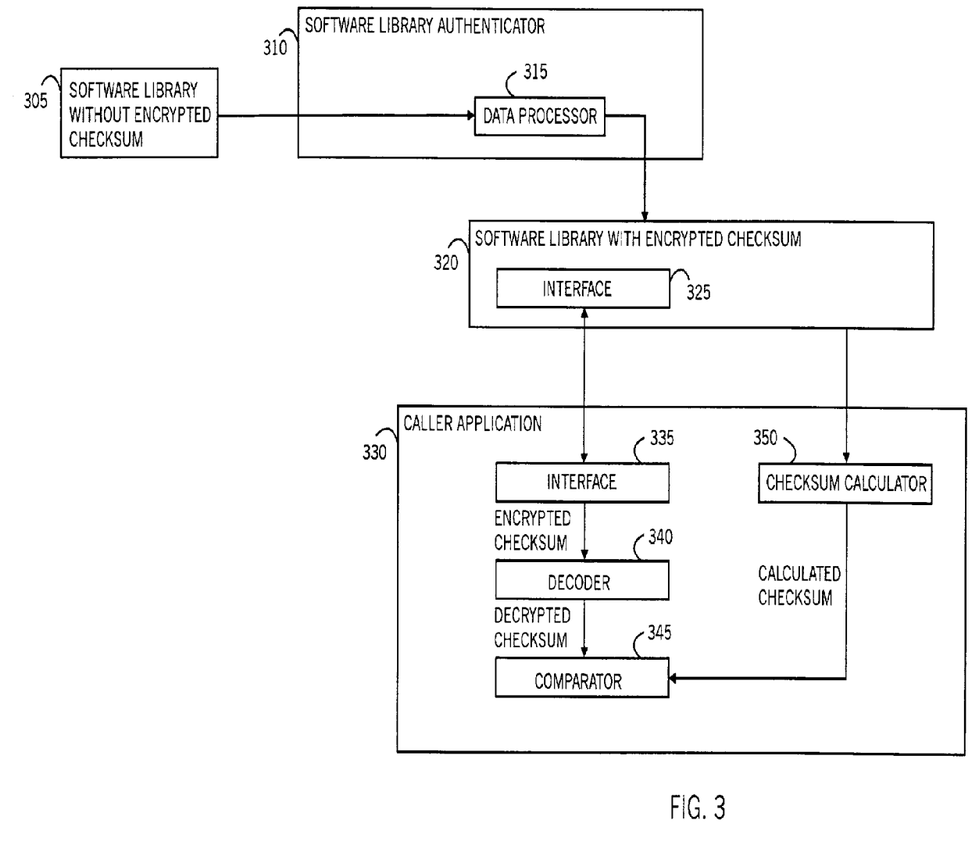
FIG. 3 is a simplified block diagram of a system for authenticating a software library, in accordance with a preferred embodiment of the present invention.

Reference is now made to FIG. 3, which is a simplified block diagram of a system for authenticating a software library, in accordance with a preferred embodiment of the present invention. Shown in FIG. 3 is an authentic software library 305 and a software library authenticator 310. Authenticator 310 includes a data processor 315 that (i) calculates a checksum of the software library, denoted CKSM1; (ii) encrypts the checksum, preferably using a private/public key encryption; and (iii) embeds the encrypted checksum into the software library. After being processing by authenticator 310, software library 320 is generated. Software library 320 includes the encrypted CKSM1. Software library 320 also includes an interface for retrieving the encrypted CKSM1 therefrom.

A caller application 330 desires to verify whether or not a software library it loads is authentic. Caller application 330 includes an interface 335 for requesting the encrypted CKSMI from software library 320. Caller application 330 also includes its own checksum calculator 350, for calculating a checksum, denoted CKSM2, directly from software library 320. A decoder 340 decrypts the encrypted CKSM1, preferably using a public key, and a comparator 345 checks whether or not CKSMI equals CKSM2. If so, then caller application 330 is assured that the software library it loads is authentic. Otherwise, caller application 330 has discovered that the software library it loads is not authentic.

Several advantages of the present invention can be noted from FIGS. 2 and 3. Use of a private/public key encryption ensures that only the creator of a software library, who knows the private key, is able to make his software library authentic; for unless the private key is known, CKSM1 cannot be encrypted. Moreover, the private key is preferably not embedded within the software library, so it does not reside on computers other than those of the creator.

An important feature of the present invention is that the method for authenticating a software library, as illustrated in FIG. 2, may be used in an opposite embodiment to authenticate an application that calls the software library. Using this opposite embodiment, a software library can refuse to load its interface unless the application calling it is a trusted application.

Figure 4:
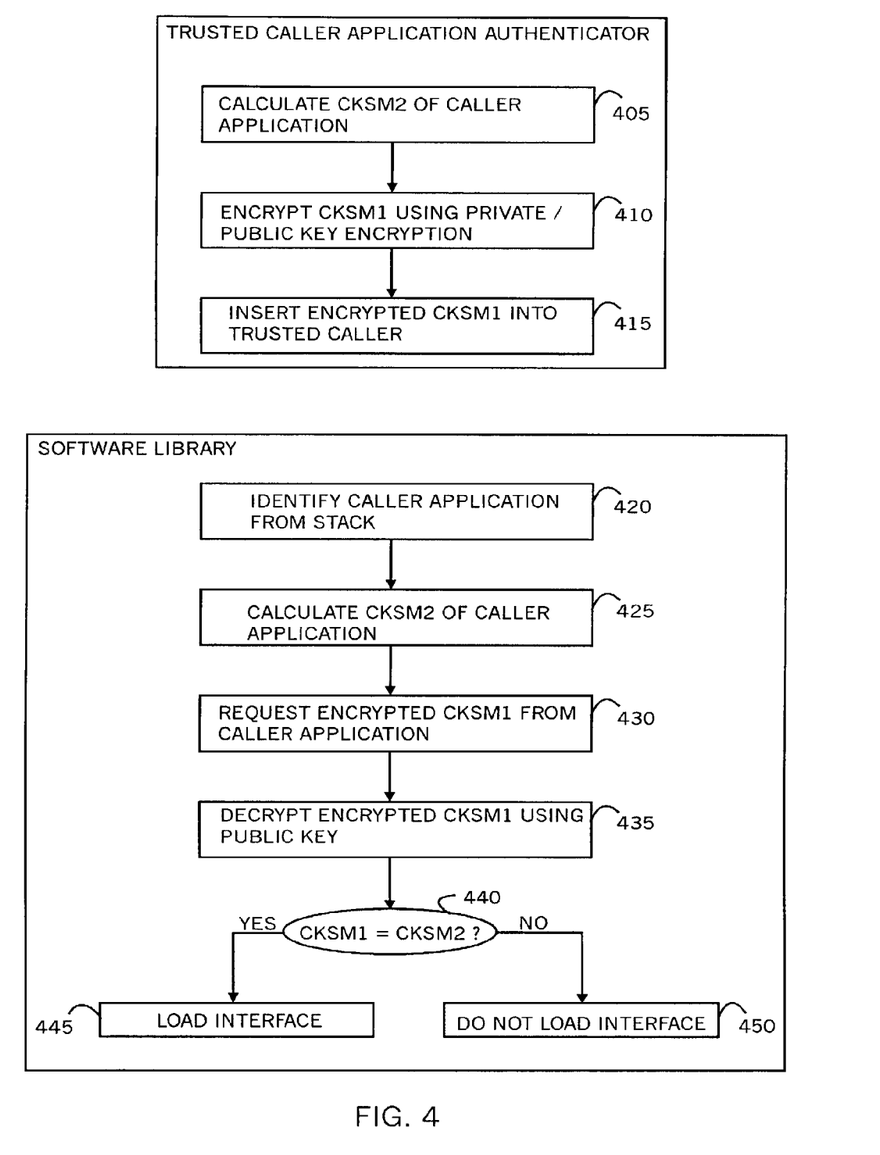
FIG. 4 is a simplified flowchart of a method for authenticating a calling application, in accordance with a preferred embodiment of the present invention.

Reference is now made to FIG. 4, which is a simplified flowchart of a method for authenticating a calling application, in accordance with a preferred embodiment of the present invention. At step 405, a checksum for a trusted caller application, denoted CKSM1, is calculated. At step 410 CKSM1 is encrypted, preferably using a private/public key encryption. At step 415 the encrypted CKSM1 is inserted into the trusted caller application. Steps 405, 410 and 415 are preferably performed by a trusted caller application authenticator. The result of these steps is embedding of an encrypted CKSM1 into the trusted caller application.

At step 420, the software library, in response to being called for loading into a caller application, identifies the caller application from a system stack. Specifically, when the caller application calls one of the functions within the software library, the called function can look in the stack one layer up to find a pointer to the caller application.

At step 425 the software library, desiring to verify that the caller application is trusted, calculates its own checksum of the caller application, denoted CKSM2. At step 430 the software library requests the encrypted CKSM1 from the caller application. At step 435 the software library decrypts the encrypted CKSM1 it receives from the caller application, preferably using a public key. At step 440 the software library determines whether or not CKSM1 equals CKSM2. If so, then at step 445 the software concludes that the caller application is trusted, and proceeds to load its interface and run. Otherwise, at step 450 the software library concludes that the caller application is not trusted, and preferably refuses to load its interface.

Figure 5:
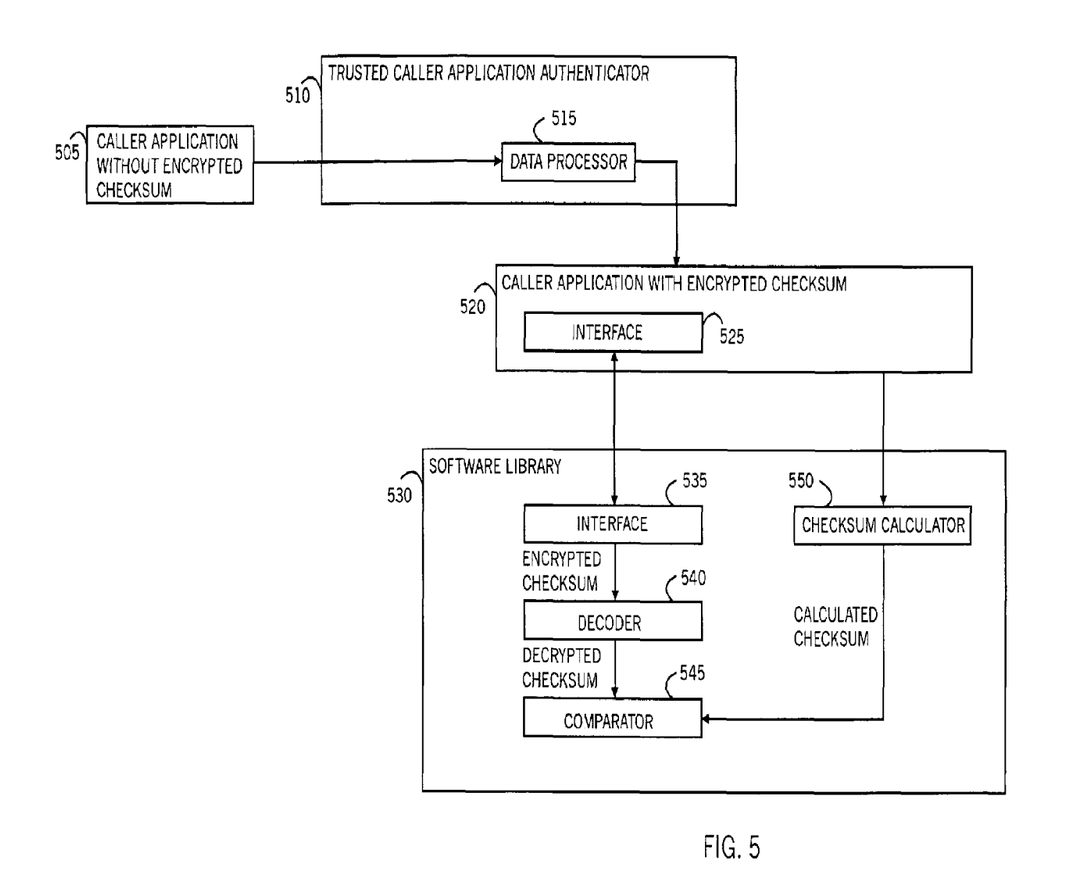
FIG. 5 is a simplified block diagram of a system for authenticating a calling application, in accordance with a preferred embodiment of the present invention.

Reference is now made to FIG. 5, which is a simplified block diagram of a system for authenticating a calling application, in accordance with a preferred embodiment of the present invention. Shown in FIG. 5 is a trusted caller application 505 and a trusted calling application authenticator 510. Authenticator 510 includes a data processor 515 that (i) calculates a checksum of the calling application, denoted CKSM1; (ii) encrypts the checksum, preferably using a private/public key encryption; and (iii) embeds the encrypted checksum into the calling application. After being processing by authenticator 510, calling application 520 is generated. Calling application 520 includes the encrypted CKSM1. Calling application 520 also includes an interface for retrieving the encrypted CKSM1 therefrom.

A software library 530 desires to verify whether or not a caller application loading it is trusted. Software library 530 includes an interface 535 for requesting the encrypted CKSM1 from caller application 520. Software library 530 also includes its own checksum calculator 550, for calculating a checksum, denoted CKSM2, directly from caller application 520. A decoder 540 decrypts the encrypted CKSM1, preferably using a public key, and a comparator 545 checks whether or not CKSM1 equals CKSM2. If so, then software library 530 is assured that the caller application loading it is trusted. Otherwise, software library 530 has discovered that the caller application loading it is not trusted.

Implementation Details

Referring back to FIG. 3, checksum calculator 350 preferably skips over the encrypted CKSM1 embedded within software library 320 when determining its checksum. Otherwise, the checksum calculated by checksum calculator 350, based on software library 320, may not agree with the checksum calculated by data processor 315, based on software library 305. Additionally, there may be other portions where software libraries 305 and 320 disagree, which preferably are also skipped by checksum calculator 350.

In a preferred embodiment of the present invention, portions of software library 305 and software library 320 can be designated as "to be skipped" when calculating checksums thereof. Such designation may be accomplished by special bit patterns preceding and/or following the designated portions. Checksum calculator 350 and data processor 315 are programmed to skip over the designated portions when calculating their checksums.

In a first embodiment of the present invention, the special bit patterns and encrypted CKSM1 are generated within software library 305 and software library 320 by software array definitions such as:

char header[16];
 char checksum[16];
 char ender[16];

The above declarations are preferably included in the program that generates software library 305. Each of the above three arrays can store 128 bits. By filling special bits into the header and ender arrays, a checksum calculator can determine that it has to skip the three arrays when calculating its checksum. Moreover, data processor 315 can use the header and ender bits to locate a position in software library 305 where the encrypted CKSM1 is to be embedded.

In a second embodiment of the present invention, the three arrays above, header[ ], checksum[ ] and ender[ ], can be combined into a single array char checksum[48];

In this second embodiment the first sixteen bytes of the array checksum[ ] are used as a header, and the last sixteen bytes of the array checksum[ ] are used as an ender. This embodiment is preferred over the first embodiment described hereinabove, since some compilers may not allocate contiguous memory locations for the three arrays header[ ], checksum[ ] and ender[ ].

In a third embodiment of the present invention, the header bytes include a length for the checksum, in which case the ender bytes are not required. Alternatively, the ender bytes may include a length for the checksum, in which case the header bytes are not required.

It is apparent to those skilled in the art that the specific lengths of sixteen bytes for a header, sixteen bytes for a checksum and sixteen bytes for an ender are not required, and other lengths may be used as well.

In a fourth embodiment of the present invention, the location of the checksum bytes is known, in which case both the header bytes and the ender bytes are not required and can be dispensed with.

Without the ability to skip over portions of software library 305 when calculating a checksum, the infamous circular "chicken and the egg" problem would arise, whereby the checksum of software library 205 cannot be calculated until the encrypted checksum is known.

Additional Considerations

In reading the above description, persons skilled in the art will realize that there are many apparent variations that can be applied to the methods and systems described.

The encrypted checksum need not be embedded within the software library or application, but can instead be included separately. Thus step 215 of FIG. 2 and step 415 of FIG. 4 may be replaced with respective alternative steps including the encrypted CKSM1 elsewhere.

In another variation, the checksum may be encrypted using a secret key, instead of a private key, and the secret key itself may be encrypted using the private key. The encrypted checksum and encrypted secret key may be embedded within the software or included elsewhere. Decryption is performed by first decrypting the secret key using a public key, and thereafter decrypting the checksum using the decrypted secret key.

In yet another variation, the checksum may be known in advance.

The present invention may also be used to authenticate in-memory versions of a software library; for example, to check whether or not an in-memory version has been patched in memory.

In another embodiment of the present invention, a protected software library may check itself before running, rather than being checked by a calling application.

The present invention may also be embodied such that multiple customers can run a client application loading a protected software library, without the need to share a common customer key. Specifically, in this embodiment a checksum of the client application is encrypted multiple times, each time using a different private/public key encryption. Thus if a version of the client application is intended for use by a select group of customers, each customer is given a different key, and a checksum of the client application is encrypted with each of their keys, obviating the need for them to share a common key. Moreover, in this embodiment a customer is dropped without affecting other customers, by simply removing the copy of the checksum encrypted for his specific key.

The present invention may also be used for authenticating software resources such as document, image files, audio files and video files.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for authenticating a software library by an application that loads the software library, comprising:
   inserting a characteristic sequence of bits into a software library;
   inserting an encrypted checksum into the software library, at a location adjacent to the characteristic sequence; and
   in response to an application loading the software library:
      calculating a checksum of the software library, including:
         locating the characteristic sequence of bits within the software library; and
         skipping over a portion of the software library at a location adjacent to the characteristic sequence;
      requesting an encrypted checksum from the software library;
      decrypting the encrypted checksum; and
      checking whether or not the decrypted checksum agrees with the calculated checksum.

2. The method of claim 1 wherein the application loading the software library performs normally if the decrypted checksum agrees with the calculated checksum, and aborts if the decrypted checksum does not agree with the calculated checksum.

3. The method of claim 1 wherein the encrypted checksum is encrypted using a private key.

4. The method of claim 1 wherein said decrypting uses a public key.

5. The method of claim 1 wherein said inserting an encrypted checksum comprises inserting the encrypted checksum at the location within the software library following the characteristic sequence of bits.

6. The method of claim 1 wherein said inserting an encrypted checksum comprises inserting the encrypted checksum at the location within the software library preceding the characteristic sequence of bits.

7. The method of claim 1 wherein said inserting a characteristic sequence of bits comprises inserting an additional characteristic sequence of bits into the software library, and wherein said inserting an encrypted checksum comprises inserting the encrypted checksum at the locations between the characteristic sequence and the additional characteristic sequence.

8. The method of claim 1 wherein the software library is a dynamically linked library (DLL).

9. The method of claim 8 wherein the DLL is used to decode protected electronic content.

10. The method of claim 1 wherein said calculating, requesting, decrypting and checking are performed by the application loading the software library.

11. The method of claim 10 wherein the application loading the software library is a document viewer.

12. The method of claim 10 wherein the application loading the software library is a web browser.

13. The method of claim 10 wherein the application loading the software library is a mail client.

14. The method of claim 10 wherein the application loading the software library is an instant messenger.

15. A method for controlling use of a software library, comprising:
   inserting a characteristic sequence of bits into an application that calls a software library;
   inserting an encrypted checksum into the application at a location adjacent to the characteristic sequence; and
   in response to the software library being called for loading by an application;
      identifying the application that is calling the software library, by examining a system stack;
      calculating a checksum of the identified caller applications, including:
         locating the characteristic sequence of bits within the caller application; and
         skipping over a portion of the caller application at a location adjacent to the characteristic sequence when calculating the checksum;
      retrieving an encrypted checksum from the caller application;
      decrypting the encrypted checksum; and
      checking whether or not the decrypted checksum agrees with the calculated checksum.

16. The method of claim 15 wherein the software library loads itself if the decrypted checksum agrees with the calculated checksum, and refuses to load itself if the decrypted checksum does not agree with the calculated checksum.

17. The method of claim 15 wherein the encrypted checksum is encrypted using a private key.

18. The method of claim 15 wherein said decrypting uses a public key.

19. The method of claim 15 wherein said inserting an encrypted checksum comprises inserting the encrypted checksum at the location within the caller application following the characteristic sequence of bits.

20. The method of claim 15 wherein said inserting an encrypted checksum comprises inserting the encrypted checksum at the location within the software library preceding the characteristic sequence of bits.

21. The method of claim 15 wherein said inserting a characteristic sequence of bits comprises inserting an additional characteristic sequence of bits into the application, and wherein said inserting an encrypted checksum comprises inserting the encrypted checksum at the locations between the characteristic sequence and the additional characteristic sequence.

22. The method of claim 15 wherein the software library is a dynamically linked library (DLL).

23. The method of claim 22 wherein the DLL is used to decode protected electronic content.

24. The method of claim 15 wherein said calculating, retrieving, decrypting and checking are performed by the software library.

25. The method of claim 15 wherein the caller application is a document viewer.

26. The method of claim 15 wherein the caller application is a web browser.

27. The method of claim 15 wherein the caller application is a mail client.

28. The method of claim 15 wherein the caller application is an instant messenger.

29. A system for authenticating a software library by an application that loads the software library, comprising:
- a data processor for inserting a characteristic sequence of bits into a software library, and for inserting an encrypted checksum into the software library at a location adjacent to the characteristic sequence;
- a checksum calculator for calculating a checksum of the software library, but skipping over a portion of the software library at a location adjacent to the characteristic sequence when calculating the checksum;
- an interface for obtaining an encrypted checksum from the software library upon request;
- a decoder for decrypting the encrypted checksum; and
- a comparator for determining whether or not the decrypted checksum agrees with the calculated checksum.

30. The system of claim 29 wherein an application loading the software library performs normally if the decrypted checksum agrees with the calculated checksum, and aborts if the decrypted checksum does not agree with the calculated checksum.

31. The system of claim 29 wherein the encrypted checksum is encrypted using a private key.

32. The system of claim 29 wherein said decoder uses a public key.

33. The system of claim 29 wherein said data processor inserts the encrypted checksum at the location within the software library following the characteristic sequence of bits.

34. The system of claim 29 wherein said data processor inserts the encrypted checksum at the location within the software library preceding the characteristic sequence of bits.

35. The system of claim 29 wherein said data processor inserts an additional characteristic sequence of bits into the software library, and inserts the encrypted checksum at the locations between the characteristic sequence and the additional characteristic sequence.

36. The system of claim 29 wherein the software library is a dynamically linked library (DLL).

37. The system of claim 36 wherein the DLL is used to decode protected electronic content.

38. The system of claim 29 further comprising a caller application including said checksum calculator, decoder and comparator.

39. The system of claim 38 wherein the caller application is a document viewer.

40. The system of claim 38 wherein the caller application is a web browser.

41. The system of claim 38 wherein the caller application is a mail client.

42. The system of claim 38 wherein the caller application is an instant messenger.

43. A system for controlling use of a software library, comprising:
- a data processor for inserting a characteristic sequence of bits into an application that calls a software library, and for inserting an encrypted checksum into the application at a location adjacent to the characteristic sequence;
- a system processor for identifying an application that is calling the software library, by examining a system stack;
- an interface for obtaining an encrypted checksum from the caller application identified by said system processor;
- a decoder for decrypting the encrypted checksum;
- a checksum calculator for calculating a checksum of the caller application, but skipping over a portion of the application at a location adjacent to the characteristic sequence when calculating the checksum; and
- a comparator for determining whether or not the decrypted checksum agrees with the calculated checksum.

44. The system of claim 43 further comprising a library loader for loading the software library if the decrypted checksum agrees with the calculated checksum, and for refusing to load the software library if the decrypted checksum does not agree with the calculated checksum.

45. The system of claim 43 wherein the encrypted checksum is encrypted using a private key.

46. The system of claim 43 wherein said decoder uses a public key.

47. The system of claim 43 wherein said data processor inserts the encrypted checksum at the location within the caller application following the characteristic sequence of bits.

48. The system of claim 43 wherein said data processor inserts the encrypted checksum at the location within the caller application preceding the characteristic sequence of bits.

49. The system of claim 43 wherein said data processor inserts an additional characteristic sequence of bits into the caller application, and inserts the encrypted checksum at the locations between the characteristic sequence and the additional characteristic sequence.

50. The system of claim 43 wherein the software library is a dynamically linked library (DLL).

51. The system of claim 50 wherein the DLL is used to decode protected electronic content.

52. The system of claim 43 wherein said checksum calculator, decoder and comparator are included within the software library.

53. The system of claim 43 wherein the caller application is a document viewer.

54. The system of claim 43 wherein the caller application is a web browser.

55. The system of claim 43 wherein the caller application is a mail client.

56. The system of claim 43 wherein the caller application is an instant messenger.

* * * * *

UNITED STATES PATENT AND TRADEMARK OFFICE
CERTIFICATE OF CORRECTION

| | | |
|---|---|---|
| PATENT NO. | : 7,155,743 B2 | Page 1 of 1 |
| APPLICATION NO. | : 10/202550 | |
| DATED | : December 26, 2006 | |
| INVENTOR(S) | : Daniel I. Goodman and David Leib | |

It is certified that error appears in the above-identified patent and that said Letters Patent is hereby corrected as shown below:

Title Page add -

Foreign Application Priority Data (30)

| | | |
|---|---|---|
| Nov. 16, 1998 | (IL) | 127093 |
| Dec. 30, 1998 | (IL) | 127869 |
| Jun. 14, 1998 | (IL) | 124895 |

Signed and Sealed this

Twenty-seventh Day of September, 2011

David J. Kappos
*Director of the United States Patent and Trademark Office*

UNITED STATES PATENT AND TRADEMARK OFFICE
CERTIFICATE OF CORRECTION

PATENT NO. : 7,155,743 B2
APPLICATION NO. : 10/202550
DATED : December 26, 2006
INVENTOR(S) : Daniel Goodman et al.

Page 1 of 1

It is certified that error appears in the above-identified patent and that said Letters Patent is hereby corrected as shown below:

Column 1 line 8, delete: "This application is a continuation-in-part of assignee's application U.S. Ser. No: 09/774,236 filed on Jan. 29, 2001, entitled "Method and System for Copy Protection of Data Content," which is a continuation-in-part of assignee's U.S. Ser. No. 09/397,331, filed on Sep. 14, 1999 now U.S. Pat. No. 6,298,446, entitled "Method and System for Copyright Protection of Digital Images Transmitted over Networks", which is a continuation-in-part of U.S. Ser. No. 09/313,067, filed May 17, 1999 now U.S. Pat. No. 6,209,103, entitled "Methods and Apparatus for Preventing the Reuse of Text, Images and Software Transmitted via Networks", each of which is incorporated by reference herein." and add -- This application is a continuation-in-part of assignee's U.S. application Ser. No. 09/774,236 filed on Jan. 29, 2001, entitled "Method and System for Copy Protection of Data Content," which is a continuation-in-part of assignee's U.S. application Ser. No. 09/397,331 filed on Sep. 14, 1999, now U.S. Pat. No. 6,298,446, entitled "Method and System for Copyright Protection of Digital Images Transmitted over Networks", which claims priority to Israeli patents IL 127093, filed on Nov. 16, 1998, and IL 127869, filed on Dec. 30, 1998, which is a continuation-in-part of U.S. application Ser. No. 09/313,067, filed May 17, 1999 now U.S. Pat. No. 6,209,103, entitled "Methods and Apparatus for Preventing the Reuse of Text, Images and Software Transmitted via Networks," now U.S. Pat. No. 6,209,103, issued on Mar. 27, 2001, which, in turn, claims priority to Israeli patent IL 124895, filed Jun. 14, 1998. --

Signed and Sealed this
Tenth Day of April, 2012

David J. Kappos
*Director of the United States Patent and Trademark Office*